Feb. 8, 1966 S. F. COX ETAL 3,233,996
BENDING GLASS SHEETS
Filed March 25, 1960 7 Sheets-Sheet 5

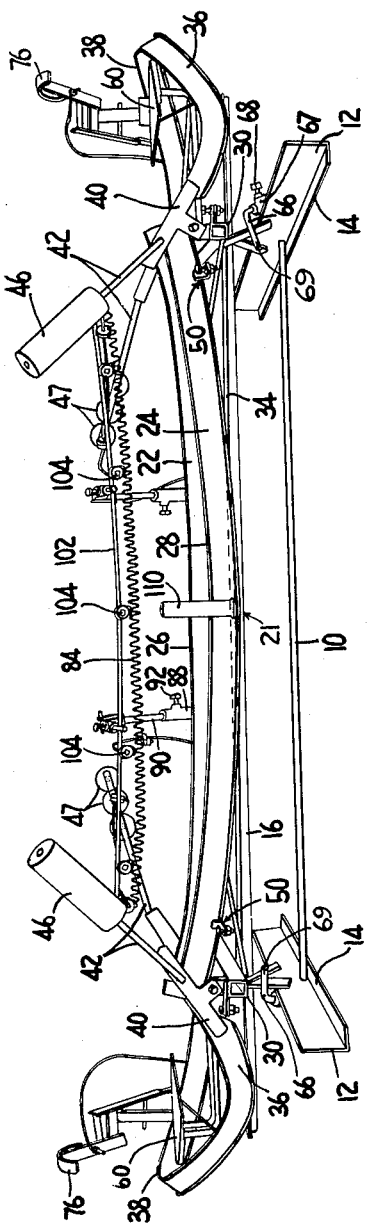

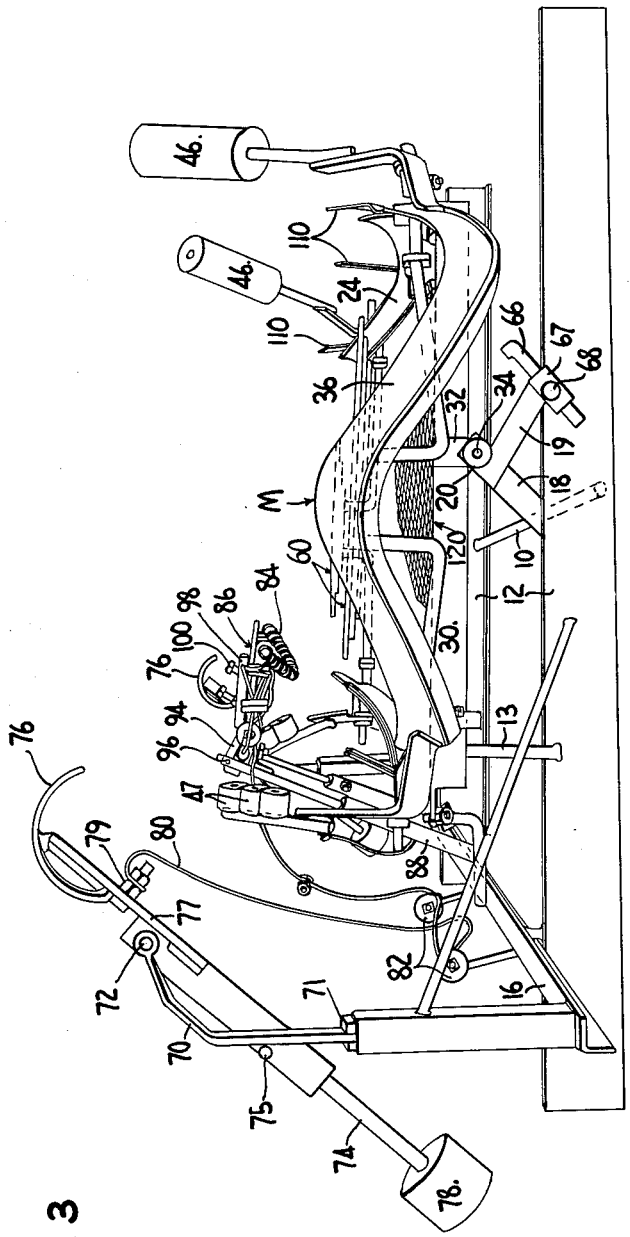

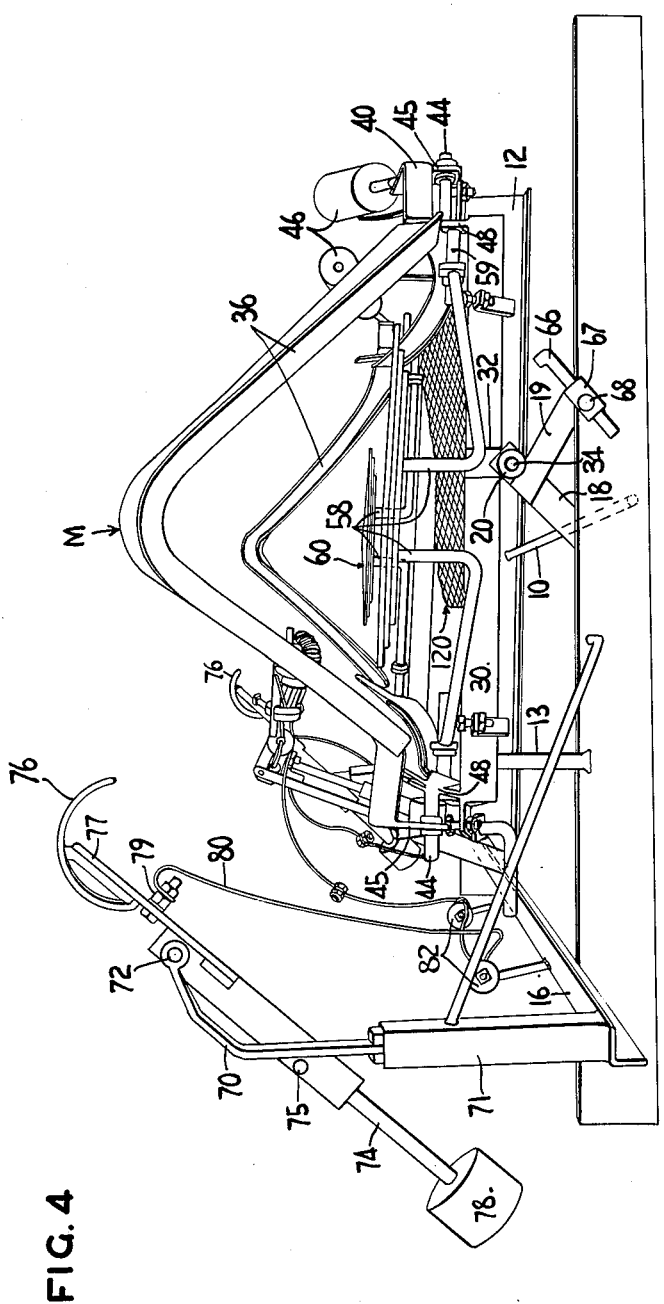

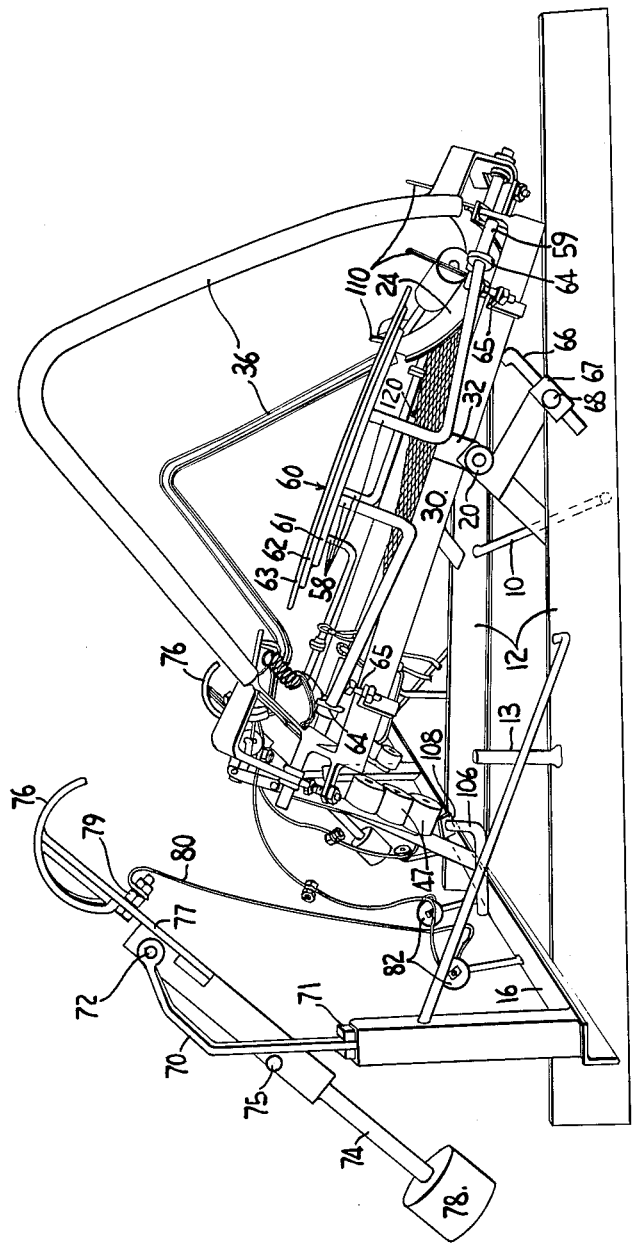

FIG. 6

INVENTORS
SAMUEL F. COX
HAROLD E. McKELVEY
and THOMAS J. REESE
BY
Oscar L. Spencer
ATTORNEY

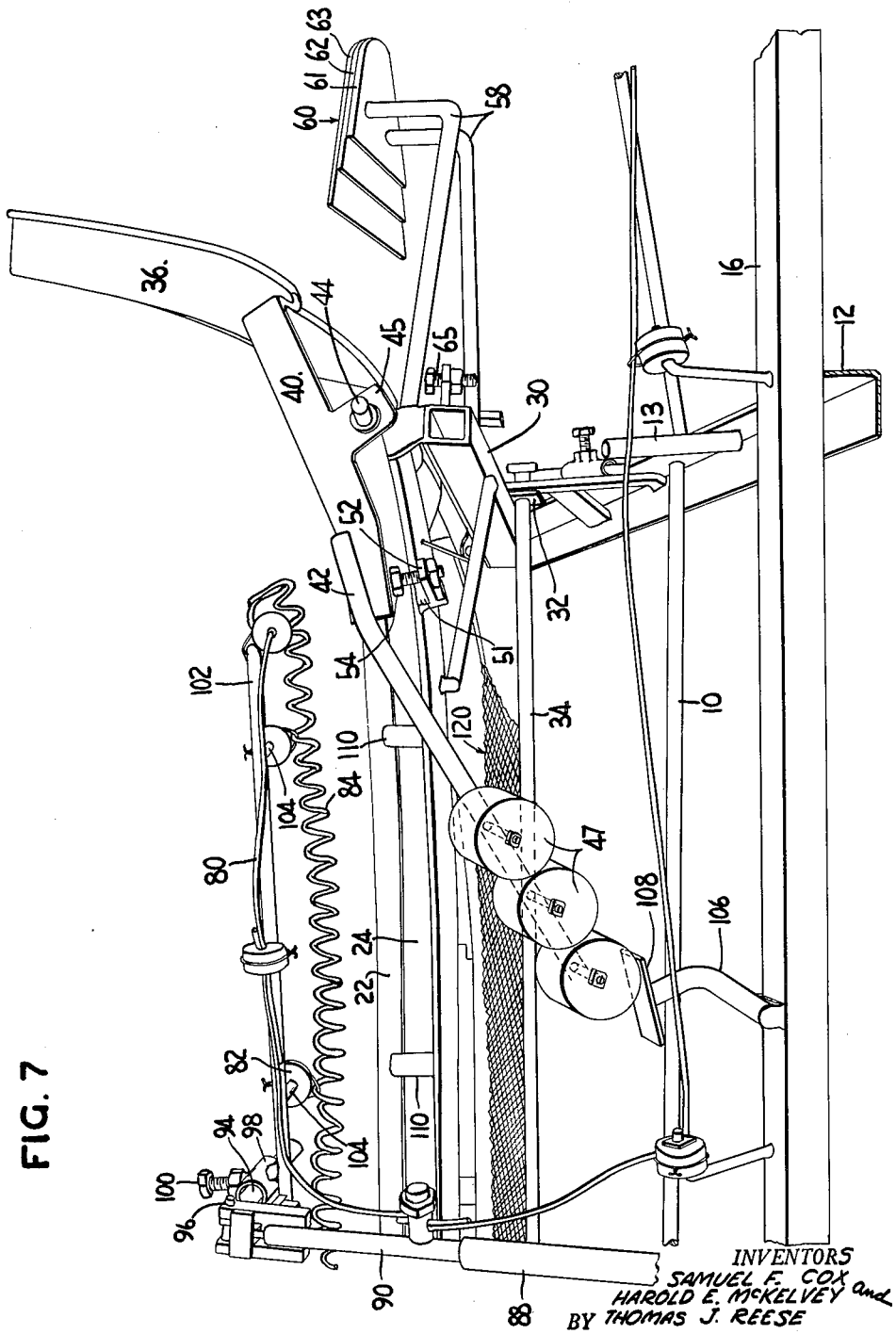

Feb. 8, 1966 S. F. COX ETAL 3,233,996
BENDING GLASS SHEETS
Filed March 25, 1960 7 Sheets-Sheet 7

INVENTORS
SAMUEL F. COX
HAROLD E. McKELVEY and
BY THOMAS J. REESE

Oscar L. Spencer
ATTORNEY

United States Patent Office 3,233,996
Patented Feb. 8, 1966

3,233,996
BENDING GLASS SHEETS
Samuel Francis Cox, Arnold, Harold Edward McKelvey, New Kensington, and Thomas Jonah Reese, Natrona Heights, Pa., assignors to Pittsburgh Plate Glass Company, a corporation of Pennsylvania
Filed Mar. 25, 1960, Ser. No. 17,710
9 Claims. (Cl. 65—107)

The present application is a continuation-in-part of application Serial No. 613,756, for Bending Glass Sheets, filed October 3, 1956, now abandoned.

This application relates to bending glass sheets. Specifically, the present invention relates to techniques for providing a compound curvature to flat glass sheets. The compound curvatures required for the latest designs in vehicle glazing panels such as automotive windshields and backlights require that the panels extend continuously from one side completely across the vehicle to the other side and include an additional auxiliary portion curved transversely of the panel into the roof of the vehicle. This transverse curve usually includes a sharply bent portion offset to one side of the longitudinal center line of the sheet.

In order to bend glass sheets in two mutually perpendicular directions along axes having varying radii, many difficulties are encountered in reproducing such compound bends to minute tolerances, especially when windshields are produced at mass production rates. When glass sheets are provided with both longitudinal and transverse bends in a non-continuous operation, such a process is too slow for mass production. It is far superior to perform the bending operation by a continuous process wherein flat glass sheets are mounted on a bending mold, conveyed continuously through a bending lehr of tunnel-like configuration, and removed from the lehr in the compound shape desired.

The present invention provides novel mold structure capable of accomplishing complex longitudinal, complex transverse bends required for compound windshields, while minimizing the problems accompanying reproducing the manufactured articles at high rates of production within the small tolerances permitted by automobile manufacturers.

In bending glass sheets to complex bending curves such as are required to form wrap-around windshields for automobiles, bending techniques have been developed which involve the use of sectionalized molds of skeleton confiuration. The most effective molds of this type are concave in elevation and include a central molding member comprising spaced rails flanked by pivotable wing members comprising reversely curved rails which rotate into a spread mold position wherein the spread mold supports the glass sheet as a beam adjacent its longitudinal extremities and at some intermediate point or points. The wing members are preferably counterweighted to rotate upwardly.

When the glass laden molds are conveyed through a tunnel-like lehr, they are subjected to gradually increasing temperatures from overhead heating elements until glass softening temperatures are attained. At these temperatures, the central portions of the glass sheets sag to conform to the upper shaping surfaces of the central molding member rails while the wing members rotate into a closed mold position to form a substantially continuous shaping frame conforming in elevation and contour to the shape desired for the bent glass, thus lifting the heat softened glass sheet extremities from a flat to a longitudinally curved configuration.

Unless the bent glass sheets are removed at the proper time from an atmosphere of glass softening temperatures, the glass sheets sag transversely. If this transverse sag is uncontrolled, it tends to assume a uniform curvature along any lateral axis traversing the glass sheet. However, the requirements of automotive manufacturers necessitates that the transverse curvature imparted to glass sheets be non-uniform with the most severe bending localized at the corner between the roof portion and the front windshield portion of the automobile.

The present invention provides techniques for bending glass sheets into curvatures involving both non-uniform longitudinal wrap-around bends and localized transverse bends involving tilting a mold during at least a portion of its travel through the bending lehr so that the localized portion bent most severely transversely to form the corner portion between the front and the roof of the windshield is located in relatively close adjacency to overhead heating elements, while the other areas of the glass sheet mounted on the mold are spaced a relatively large distance from the overhead heating elements.

The present invention envisions that a mold comprising hinged molding members may be either fixed to support the glass sheets for bending in tilted position about an axis transverse to the axes about which the molding members are hinged throughout the bending cycle or the mold may be so constructed that it initially supports unbent glass sheets in a flat horizontal position and is subsequently tilted during the bending operation to bring a critical portion of the glass sheet into close proximity to special heating elements adapted to produce a transverse bend localized in the critical portion.

In the drawings forming part of the description of particular embodiments illustrating the present invention, FIGURE 1 is an elevational view partially in perspective of a bending mold shown in its open position preparatory to loading one or a pair of glass sheets thereon for bending.

FIGURE 2 is a view similar to FIGURE 1 showing the position of the bending mold after the bend has been completed.

FIGURE 3 is an end elevation partially in perspective showing the mold open preparatory to receiving flat glass sheets for loading.

FIGURE 4 is a view similar to FIGURE 3 showing the mold in an intermediate position during the bending cycle.

FIGURE 5 is an additional view taken in the direction of FIGURES 3 and 4 and showing the mold position upon completion of the bend.

FIGURE 6 is an enlarged perspective view showing the mold in an intermediate position during its bending cycle, and FIGURE 7 is a view similar to FIGURE 6 showing the portion of the mold upon completion of the bending cycle.

Figure 10:
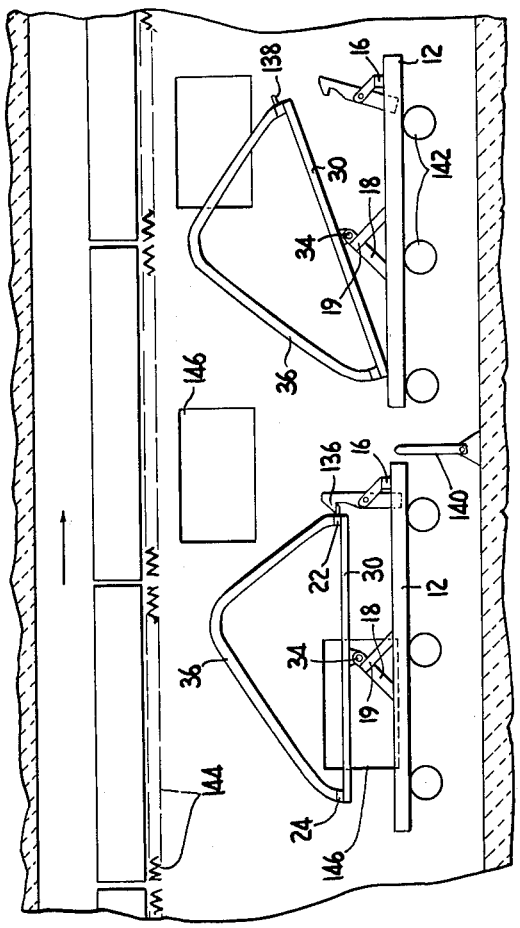
FIGURE 10 is a schematic longitudinal sectional view of a portion of a bending lehr incorporating molds having tripping means for releasing the mold to permit its tilting.

The bending mold support frame according to one embodiment of the present invention comprises a longitudinally extending rod 10 interconnecting cross beams 12. The latter cross beams may include upwardly extending posts 13, and bottom flanges 14 which ride on top of conveyor rolls (not shown) when the mold supporting one or more glass sheets for bending is conveyed laterally through a bending lehr. Cross beams 12 are interconnected by a longitudinally extending L-beam 16.

Each cross beam 12 has fixed thereto diagonally extending braces 18 and 19, which form inverted Y shapes, the upper ends of which form bearing housings 20 or pivot support means. The bearing housings 20 are aligned along a longitudinal axis about which the mold M may be pivoted.

Bending mold M comprises a central molding section 21 including spaced rails 22 and 24 extending longitudinally of the mold. Rail 22 has an upper shaping surface 26 and rail 24 has an upper shaping surface 28. The respective shaping surfaces conform to the shapes desired for the opposite sides of the central portion of the glass sheet to be bent on the molds. Rails 22 and 24 are interconnected by beam supports 30 extending transversely of the mold and interconnecting the bottoms of rails 22 and 24 adjacent their longitudinal extremities.

The beam supports 30 each include a downwardly extending ear 32 that is apertured at its lower extremity to interconnect a beam support with one end of a bearing or pivot rod 34. The latter extends longitudinally of the mold and provides a positive bearing contact for the mold relative to the bearing housing 20.

Flanking the outboard extremities of the center mold section 21 are wing sections 36 having upper shaping surfaces 38. The wing sections are generally reversely curved from their inboard extremities to enclose the outboard extremities of the mold. Adjacent each inboard extremity of each member 36 is a curved strap 40.

The curved straps terminate at their inboard extremities in counterweighted pivot arms 42. A stub pivot 44 is provided for each strap 40. Apertured ears 45 depend from the straps 40 to make bearing contact about the stub pivots 44. Counterweights 46 are attached to the inboard extremities of the longitudinally opposite counterweighted arms 42 on one side of the mold, while roller type counterweights 47 are attached to the laterally opposite arms. The counterweights are of such mass as to force the wing members 36 to rotate upwardly whenever the supported unbent glass has softened sufficiently to permit its tips of flex in response to the bending moments applied about the pivots 44. The stub pivot rods 44 are connected to brackets 48 attached to the longitudinal extremities of the beam supports 30. The pivots 44 form pivot means for pivoting the wing sections 36 or flanking molding members relative to the central molding section or member about axes extending transversely of the mold.

Stop members 50 are depicted generally in FIGURES 1 and 2 and in greater detail in FIGURES 6 and 7. As seen specifically in FIGURES 6 and 7, the stop members 50 each comprise a depending flange 51 attached to and extending from the bottom of one of the center rails 22 or 24. An additional flange 52 which is apertured to receive a set screw 54 extends normal to the depending flange 51. Set screw 54 is threaded through the aperture of the apertured flange 52 to provide an abutment against which the bottom of a corresponding counterweighted arm 42 or strap 40 comes into contact when the wing member has completed a predetermined angle of rotation. When this contact takes place, upper shaping surfaces 26, 28, 38, and 38 define a substantially continuous frame conforming in elevation and outline to the shape desired for the bent glass sheet.

A pair of J-shaped support rods 58 are used to support heat abstractor members 60. The J-shaped support rods 58 are attached at their inboard extremities to rods connected to the brackets 48 through connecting rods 59. The heat abstractor members 60 are composed of individual plates 61, 62 and 63 graduated in size and connected together to provide a massive body having relatively high capacity compared to the adjacent portions of the mold in the vicinity of the extremities of the mold shaping surface when the mold is in the open position of FIGURE 1. The purpose of the heat abstractor members 60 is to abstract heat from the vicinity of the tips of the glass sheets mounted on the mold for bending to keep the temperature of the glass adjacent the tips low relative to the remainder of the sheets. Thus, the tips are maintained relatively cold during the initial stages of bending and the tips are inhibited from sagging, thus enhancing the possibility that the tips of the glass sheet may conform to the flat shape desired for the sides of the wrap-around windshields desired by automotive manufacturers.

Feathering the thickness of the heat abstractor members 60 causes a moderation of the amount of heat abstracted from different regions of the glass tips, thus avoiding any steep temperature gradients inwardly from the tips of the glass sheets.

The heat abstractor members 60 are pivotable with their J-shape support drives 58 about bearings 64 connected to the ends of the connecting rods 59. Stop members 65 are fixed to the beam supports 30 to provide abutments for the J-shaped support rods 58 to support the heat abstractor members 60 in the proper position when the mold is opened to receive flat glass sheets for bending. The heat abstractor members and their J-shaped support rods 58 are rotatable in an inboard direction about bearings 64 to provide maximum clearance for storing the molds when not in use.

At each end of the bending mold, an angular finger 66 is mounted in a sleeve 67 in any fixed relation provided by a set screw 68. Sleeve 67 is secured to a cross beam 12. Each finger 66 has an inboard extending extension 69 which intersects the rotational path of beam support 30. Thus, the inboard extending extensions 69 provide means for inhibiting further pivoting of the mold relative to its support frame when beam supports 30 rotate into abutment with extensions 69 of fingers 66.

An angular support column 70 is attached to an upright 71 extending upwardly from each longitudinal extremity of the longitudinally extending L-beam 16. Each column includes a pivot hinge 72 at its upper extremity. A counterweighted arm 74 is mounted for rotation about the hinge 72. Arm 74 also carries a pin 75, which extends outwardly therefrom to abut column 70 and limit the rotation of the arm to which it is attached.

An electrode 76 is secured to an extension 77 connected to the portion of the arm 74 on the side of the pivot opposite that end containing a counterweight 78. A loose, heavy, flexible wire 80 of a suitable metal having the requisite properties of conductivity, flexibility and freedom from oxidization at lehr temperatures and supported by suitable ceramic brackets 82 connects each electrode 76 to heating coils 84, located in spaced relation to and in alignment with a longitudinally extending area located slightly inboard of rail 22.

The coils 84 are preferably of the electrical resistance type and are of open coiled wire to enable heat radiated by overhead lehr heaters to pass through the interstices between coils to the glass sheet undergoing bending. If the heater coils are supported in a solid support rather than an open support, the critical strip of the glass sheet immediately beneath the coils 84 would be shielded from the overhead lehr heaters, and the critical strip would be prevented from heating to the temperatures which facilitate its softening by radiation from the overhead energized coils of the lehr.

An open support structure 86 for the heating coils 84 includes a pair of vertical sleeves 88 fixed to the longitudinally extending L-beam 16, and a rod 90 slidable axially within each sleeve. Set screws 92 are included to lock the rods 90 within sleeves 88. Additional rods 94 are jointed to rods 90 at elbow joints 96. Sleeves 98 are adjusted axially relative to rods 94 and locked in position by means of set screws 100. A rod 102 (FIGURE 1) interconnects the sleeve 98 and extends therebeyond to provide a rigid support for branches 104. The latter in turn support some of the insulating ceramic brackets 82 to provide spaced supports for the heating coils 84.

Longitudinally extending L-beam 16 also carries an angular support 106 adjacent each end. A bearing plate 108 is fixed to the free upper end of each angular support 106. Each bearing plate is located in the path of rotation of a counterweight 47.

The mold also includes finger guides 110 located adjacent the extremities and centrally of rail 24. These serve to guide the location of the flat glass sheet laterally of the mold when the mold is first loaded and to prevent the glass from slipping laterally off the tilted mold.

The mold also includes a heat abstractor member 120 which includes an expanded metal screen 122 partially supported on a plate 124. The heat abstractor member is spaced laterally from the heating element 84 and positioned in spaced relation to and aligned with a longitudinally extending area located within the mold outline slightly inboard of rail 24 to provide a body of relatively high heat capacity compared to that of the adjacent mold structure in order to inhibit transverse sagging of the portion of the glass sheet it faces when the mold supports a glass sheet for bending. The abstractor member construction thus has a relatively high heat capacity per unit area in the portion containing screen 122 superimposed on plate 124 adjacent rail 24 and a relatively low heat capacity per unit area in the unsupported region of the metal screen 122 remote from rail 24.

The purpose of having the expanded metal screen 122 extend beyond plate 124 in the intermediate region between the reinforced portion of the screen and the edge of the heat abstractor 120 is to graduate the rate of heat abstraction from the glass between the region immediately adjacent the reinforced screen portion and the unshielded glass area. Graduating the heat abstracted lessens the chance of thermal shock.

A set of refractory fingers 128 are also included to help indicate whether the glass has assumed the curvature desired in various localized regions. These fingers may be in the form of woven ceramic sleeves supported on metal rods and extending above the end of the support rods. When the glass has sagged sufficiently, the ceramic sleeve extensions are contacted by the sagging glass and begin to deflect, thus indicating completion of that portion of the bend.

Glass sheets are mounted on the longitudinal extremities of rails 22 and 24 and the outboard extremities of the flanking wing sections 36. When mounting the glass sheets, the side adjacent the person loading the mold is abutted against fingers 110 and the glass extremities extend equal distance beyond the wing section extremities to insure proper registry. The glass laden mold is then carried transversely through a bending lehr with rail 22 at its leading side.

As the glass laden mold passes through the bending lehr, the effect of the overhead lehr heating elements causes the glass to soften. Thus, the rotational moments provided by the counterweights 46 and 47 about the stub pivot rods 44 cause the wing members 36 to rotate upwardly relative to the central molding section 21.

The mass of mold M pivoted about the longitudinal pivot rod 34 is distributed in such a manner that initially, there is a slight tendency to rotate the mold in a counterclockwise direction as seen in FIGURES 3, 4 and 5. Hence, posts 13 contact the bottom of beam supports 30 to prevent the mold M from tilting too far in a counterclockwise direction. Posts 13 provide means forming part of the mold support that cooperates with beam supports 30 which serve as means attached to a molding section to hold the mold in a predetermined oriented position when the glass sheet is loaded.

As the sheet or sheets soften, wing members 36 are pivoted upwardly until roller counterweights 47 come into abutment with the bearing plates 108 carried by the angular supports 106. The abutting contact tends to nullify the effect of the relatively large mass of counterweights 47 on the total mass distribution of the mold about pivot 34. Since the mold is only slightly counterbalanced to rotate counterclockwise as seen in FIGURES 3, 4, 5, and the clockwise moment of rotation about pivot 34 now tends to exceed the counterclockwise moment of rotation of the entire mold about longitudinally extending pivot rod 34. Further softening of the glass causes the wing sections 36 to continue to close and the entire mold begins to pivot about the longitudinal pivot axis formed by pivot rod 34. Thus the roller counterweights 47 or means attached to the mold cooperate with the bearing plates 108 or means carried by the mold support to provide means for tilting the mold M about the longitudinal pivot axis to a position angularly disposed relative to said predetermined oriented position or, in other words, means for causing mold rail 22 to attain a higher elevation than mold rail 24. In this embodiment, the tilting means also serves to maintain the bending mold tilted during a portion of the bending cycle.

As the mold pivots, it brings mold rail 22 and its supported portion of the glass sheet into closer adjacency to the overhead heating coils 84 and the heating coils of the lehr. Thus, the longitudinally extending strip of glass to be bent severely is moved into relatively close proximity to the overhead heating elements, which facilitate softening of the strip by virtue of the greater intensity of heat to which the strip is exposed compared to the rest of the sheet. The central portion of the glass laterally spaced from the severely bent strip is maintained relatively flat by virtue of its proximity to the heat abstractor member 120 during the bending cycle.

It is also within the scope of our invention to provide a mold that is fixed in tilted position about an axis extending longitudinally of the mold. In such a mold, the downwardly extending ears 32 are permanently secured to the pivot rod 34 so that the mold is permanently tilted in a plane extending transversely in an oblique direction relative to the supporting structure. In this embodiment, the ears 32 serve as means attached to a molding section that is operatively connected to the pivot rod 34 so that it cooperates with the pivot rod 34, which serves as means forming part of the mold support, for supporting the mold in a plane extending obliquely in a direction transverse of the mold support.

It is desirable to bend glass sheets in pairs by the use of overhead heaters exclusively. The virtue of the use of overhead heaters lies in the fact that when the heaters impart radiant energy downwardly, the upper sheet of a pair of sheets to be bent simultaneously conforms more intimately to the shape of the bottom sheet by virtue of its closer proximity to the source of heat and also because it fails to transmit to the bottom sheet some of the incident radiation from the overhead heaters which it absorbs and reflects, thus enabling the bottom sheet of a pair to be relatively rigid compared to the upper sheet.

Figure 9:
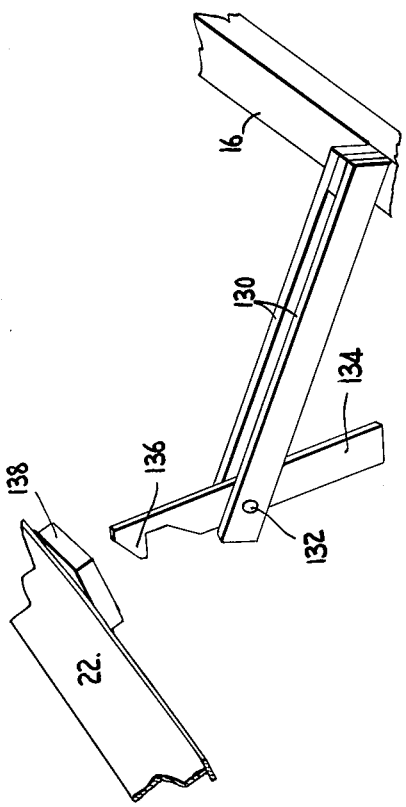
FIGURES 8 and 9 are perspective views of an alternate structure for a releasable holding device to determine whether the mold is held horizontally or tilted about its pivotal axis, shown in its locked position holding the mold in horizontal disposition and in open position permitting the mold to tilt, respectively.
Figure 8:
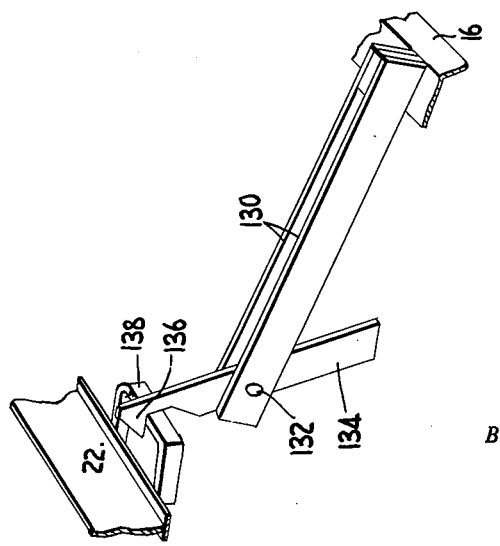

FIGURES 8, 9 and 10 disclose an alternate device for causing the mold to assume a tilting position relative to the mold support. The alternate tripping mechanism includes an obliquely upwardly extending bifurcated arm 130 fixed to the upper surface of the longitudinally extending L-beam 16 at the leading edge of the mold support and a hinge rod 132 interconnecting the arms adjacent their upper ends. A freely pivotable latch 134 having a hooked end 136 is mounted for rotation about hinge rod 132. An eye 138 of formed steel is attached as by welding to the bottom of rail member 22.

Normally, hook 136 engages eye 138 to hold the mold in a predetermined oriented position about the longitudinal axis of the mold, namely, a horizontal position. However, when hook 136 disengages eye 138, the mold M is free to rotate about pivot rod 34. By careful selection of the relative weights of the counterweights 46 and 47 and the careful selection of the location of the longitudinally extending axis defined by pivot rod 34, mold M rotates slowly when hook 136 disengages eye 138, thus minimizing any tendency to unseat the glass sheet by virtue of sudden rapid pivoting. In this embodiment, the construction and arrangement of the mold out of balance with respect to the longitudinally extending axis provides means for tilting the mold so that one center section side rail 22 is caused to attain a higher elevation than the other side rail 24.

In FIGURE 10, a section of a bending lehr is shown including an upwardly extending finger stop 140 whose upper end terminates below any of the longitudinally extending support structures of the mold, such as L-beam 16 or pivot rod 34. The stop may be rotatable or may be fixed in a vertical position. The lehr includes a set of lehr conveyor rolls 142 which extend across the lehr. Longitudinally extending overhead lehr heaters 144 are supported from the lehr roof in a conventional manner. Also, windows 146 are included in the lehr side walls for operating personnel to view the progress of the bending cycle.

When the molds are conveyed transversely through the lehr, the bottom of latch 134 comes into abutment with the top of finger stop 140, the former is caused to rotate about pivot 132 to disengage the latch hook 136 from the eye 138 attached to the front center mold rail 22. Because of the distribution of its mass, the mold then pivots about pivot rod 34 to another position defined by abutment of beam supports 30 interconnecting mold rails 22 and 24 with cross beams 12 as shown in the mold on the right side of FIG. 10 to lift mold rail 22. The latter position is angularly disposed relative to the predetermined oriented position occupied when hook 136 engages eye 138. Therefore, the portion of the glass sheet carried near mold rail 22 is in closer adjacency to the upper lehr heaters 144 as the mold is conveyed through the lehr, thus causing this portion of the glass to soften preferentially to the other portions of the glass sheet.

In the embodiment of FIGS. 8, 9 and 10, the hook 136 serves as means carried by the mold support, the eye 138 serves as means carried by the mold that is operatively connected to the hook 136 so that the latter cooperates with the eye for supporting the mold in a predetermined oriented position about longitudinal axis 34, the cross beams 12 serve as additional means carried by the support for supporting the mold in another position angularly disposed relative to the predetermined oriented position and the distribution of the mass of the mold is offset with respect to pivot axis 34 so that its center of gravity serves as means on the mold to move the mold from the predetermined oriented position to the other position angularly disposed thereto.

While the drawing depicting the last embodiment does not show either a heating element 84 or a heat absorber member 120 such as depicted in FIGS. 1 to 7, it is understood that either or both of these features may be employed or dispensed with as required by the severity or the complicated curvature desired of the transverse component of the compound bend fabricated on the bending mold in any of the illustrative embodiments of the present invention, regardless of whether the mold is permanently tilted about its longitudinal axis or pivoted thereabout during the bending cycle.

While only certain embodiments have been described for purposes of illustration, it is understood that various modifications equivalent to those described herein may be made within the scope of the present invention as defined by the accompanying claims.

What is claimed is:

1. Apparatus for bending an elongated glass sheet to a complex bend including a non-uniform longitudinal bend and a non-uniform transverse bend having a localized, sharply bent region offset from the longitudinal center line of said sheet, said apparatus comprising a support frame, an elongated, sectionalized mold mounted on said support frame comprising molding sections, pivot means pivotally interconnecting adjacent molding sections for movement relative to one another about axes extending transversely of the mold into a spread position longitudinally of the mold for receiving unbent glass sheets and into a closed mold position longitudinally of the mold forming a substantially continuous surface conforming in elevation and outline to the shape desired for the bent glass sheets, support means attached to a molding section and support means forming part of said support frame and mechanically coacting with said support means attached to a molding section to support said mold at an acute angle relative to said support frame in a plane extending obliquely in a direction transversely of said support frame.

2. Apparatus for bending an elongated glass sheet to a complex bend including a non-uniform longitudinal bend and a non-uniform transverse bend having a localized, sharply bent region offset from the longitudinal center line of said sheet, said apparatus comprising a support frame, an elongated, sectionalized mold comprising molding sections, pivot means pivotally interconnecting adjacent molding sections for movement relative to one another about axes extending transversely of the mold into a spread position longitudinally of the mold for receiving unbent glass sheets and into a closed mold position longitudinally of the mold forming a substantially continuous surface conforming in elevation and outline to the shape desired for the bent glass sheet, additional pivot means pivoting said mold to said support frame about a longitudinally extending axis, said mold having its center of gravity disposed to one side of said longitudinally extending axis, first stop means carried by said mold, second stop means carried by said support and mechanically coacting with said first stop means to support said mold in a predetermined oriented position about said longitudinally extending axis, support means carried by said suport frame and spaced from said stop means carried by said support frame for supporting said mold in another position angularly displaced relative to said predetermined oriented position, and actuating means on said apparatus to move said mold from said predetermined oriented position to said another position.

3. Apparatus as in claim 2, wherein said first stop means carried by the mold is a U-shaped member attached to the mold to form an eye therewith and wherein said second stop means carried by said support frame is a bifurcated arm fixed to the support frame with a freely pivotable latch member mounted thereon to releasably engage said first stop means carried by the mold and initially support the mold in said predetermined oriented position.

4. Apparatus as in claim 2, wherein said actuating means on said apparatus to move said mold from said predetermined oriented position to said another position is an abutment means carried by the support to one side of said longitudinally extending axis and in alignment with the path of movement of at least one counterweighted pivot arm attached to one of said molding sections, said abutment means cooperating with said counterweighted pivot arm to cause the mold to pivot about said longitudinally extending axis upon relative rotation of said molding sections toward the closed mold position.

5. Apparatus for bending an elongated glass sheet to a complex bend including a non-uniform longitudinal bend and a non-uniform transverse bend having a localized, sharply bent region offset from the longitudinal center line of said sheet, said apparatus comprising a support frame, an elongated, sectionalized mold comprising a central molding section including a first rail extending longitudinal thereof relatively close to said sharply bent region and a second rail spaced laterally from said first rail and extending longitudinally of said central molding section relatively remote from said sharply bent region, and wing sections flanking the central molding section in longitudinal relation thereto, pivot means pivotally interconnecting each said wing section to said central molding section for pivoting the wing sections relative to the central molding section about pivot axes extending transversely of the mold into a spread position longitudinally of the mold for receiving unbent glass sheets and into a closed mold position longitudinally of the mold forming a substantially continuous surface conforming in elevation and outline to the shape desired for the bent glass sheet, additional pivot means pivoting said mold to said support frame about a longitudinally extending axis, said mold having its center of gravity disposed to one side of said longitudinally extending axis, first stop means carried by said mold, second stop means carried by said support and operably connected to said first stop means for cooperating with said first stop means to support said mold in a predetermined oriented position about said longitudinally extending axis, support means carried by said support frame for supporting said mold in another position angularly displaced relative to said predetermined oriented position, and actuating means on said apparatus to move said mold from said predetermined oriented position to said another position.

6. Apparatus for bending glass sheets to complex curvatures involving both longitudinal and transverse bends of varying degree of curvature comprising a support frame, a sectionalized bending mold including a central molding member, pivot means pivotally mounting said central molding member to said support frame for pivotal movement relative thereto about a longitudinal axis, and flanking molding members provided with counterweighted pivot arms, additional pivot means pivotally interconnecting each said flanking molding member to said central molding section for pivoting the flanking molding members relative to the central molding section about pivot axes extending transversely of the mold into a spread position for receiving unbent glass sheets and into a closed mold position to provide a mold having a substantially continuous surface conforming in elevation and contour to the shape desired for the bent sheet, and abutment means carried by said apparatus to one side of said longitudinal axis and in alignment with the path of movement of at least one of said counterweighted pivot arms and cooperating therewith to cause the mold to pivot about the longitudinal axis upon rotation of the flanking molding members toward the closed mold position.

7. A method of bending a glass sheet into a complex curvature including a non-uniform longitudinal bend about an axis extending transversely of the sheet and a non-uniform transverse bend about an axis extending longitudinally of the sheet, said transverse bend having a localized, sharply bent region offset from the longitudinal center line of the sheet, comprising supporting the sheet above a suitable shaping surface, imparting sufficient radiant energy downwardly onto the sheet to expose the latter while so supported to glass softening temperature and applying mechanical force to bend the heat-softened glass sheet about an axis extending transversely thereof, and characterized by supporting the sheet with the side edge thereof which is closer to the localized, sharply bent region of the transverse bend at a higher elevation than the other side edge of the supported glass sheet for at least a portion of the time the sheet is exposed to said glass softening temperature.

8. The method according to claim 7, wherein said sheet is continuously supported throughout its period of exposure to said glass softening temperature with said side edge which is closer to said localized, sharply bent region at a higher elevation than said other side edge.

9. The method according to claim 7, wherein said sheet is initially supported in a first orientation relative to an axis extending longitudinally of the sheet and the entire sheet is then pivoted about said longitudinal axis during its exposure to said glass softening temperature.

References Cited by the Examiner
UNITED STATES PATENTS

| | | | |
|---|---|---|---|
| 760,959 | 9/1904 | Connington | 65—158 |
| 2,021,197 | 11/1935 | Owen | 65—107 |
| 2,111,392 | 3/1938 | Galey | 65—273 |
| 2,330,349 | 9/1943 | Galey | 65—291 |
| 2,450,297 | 9/1948 | Pearsen et al. | 65—103 |
| 2,551,606 | 5/1951 | Jendrisak | 65—107 |
| 2,646,647 | 7/1953 | Bamford et al. | 65—103 |
| 2,691,854 | 10/1954 | Rugg | 65—26 |
| 2,766,555 | 10/1956 | Jendrisak et al. | 65—103 |
| 2,871,623 | 2/1959 | Marini | 65—23 |

FOREIGN PATENTS 538,777   12/1955   Belgium.

DONALL H. SYLVESTER, *Primary Examiner.*

CHARLES R. HODGES, ARTHUR P. KENT, MORRIS O. WOLK, WILLIAM B. KNIGHT, *Examiners.*